US010997162B2

(12) United States Patent
Grabs et al.

(10) Patent No.: US 10,997,162 B2
(45) Date of Patent: May 4, 2021

(54) TRACKING INTERMEDIATE CHANGES IN DATABASE DATA

(71) Applicant: Snowflake Inc., San Mateo, CA (US)

(72) Inventors: Torsten Grabs, San Mateo, CA (US); Istvan Cseri, Seattle, WA (US); Benoit Dageville, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/824,676

(22) Filed: Mar. 19, 2020

(65) Prior Publication Data

US 2020/0218714 A1 Jul. 9, 2020

Related U.S. Application Data

(63) Continuation of application No. 16/182,216, filed on Nov. 6, 2018.

(51) Int. Cl.
*G06F 17/00* (2019.01)
*G06F 16/23* (2019.01)
*G06F 16/22* (2019.01)
*G06F 16/2455* (2019.01)

(52) U.S. Cl.
CPC ...... *G06F 16/2379* (2019.01); *G06F 16/2282* (2019.01); *G06F 16/2456* (2019.01); *G06F 16/24554* (2019.01)

(58) Field of Classification Search
CPC .............. G06F 16/2379; G06F 16/2282; G06F 16/2456; G06F 16/24554; G06F 16/219
See application file for complete search history.

(56) References Cited

U.S. PATENT DOCUMENTS

| 2005/0114409 A1* | 5/2005 | Sinha ................... G06F 16/219 |
| 2006/0122964 A1 | 6/2006 | Yu et al. |
| 2007/0130171 A1* | 6/2007 | Hanckel .............. G06F 16/2477 |

(Continued)

FOREIGN PATENT DOCUMENTS

WO WO-2020096789 A1 5/2020

OTHER PUBLICATIONS

"U.S. Appl. No. 16/182,216, Preliminary Amendment Filed Oct. 21, 2019", 9 pgs.

(Continued)

*Primary Examiner* — Syed H Hasan
(74) *Attorney, Agent, or Firm* — Schwegman Lundberg & Woessner, P.A.

(57) ABSTRACT

Systems, methods, and devices for tracking a series of changes to database data are disclosed. A method includes executing a transaction to modify data in a micro-partition of a table of a database by generating a new micro-partition that embodies the transaction. The method includes associating transaction data with the new micro-partition, wherein the transaction data comprises a timestamp when the transaction was fully executed, and further includes associating modification data with the new micro-partition that comprises an indication of one or more rows of the table that were modified by the transaction. The method includes joining the transaction data with the modification data to generate joined data and querying the joined data to determine a listing of intermediate modifications made to the table between a first timestamp and a second timestamp.

27 Claims, 10 Drawing Sheets

(56) References Cited

U.S. PATENT DOCUMENTS

| | | |
|---|---|---|
| 2008/0098045 A1* | 4/2008 | Radhakrishnan ..... G06F 16/284 |
| 2009/0037489 A1* | 2/2009 | Grundler ................ G06Q 10/10 |
| 2011/0302205 A1 | 12/2011 | Sinha et al. |
| 2014/0095471 A1 | 4/2014 | Deshmukh et al. |
| 2014/0365533 A1 | 12/2014 | Debray et al. |
| 2017/0235766 A1* | 8/2017 | Mawji ................. G06F 16/9035 707/722 |
| 2020/0142987 A1 | 5/2020 | Grabs et al. |

OTHER PUBLICATIONS

"U.S. Appl. No. PCT/US2019/058084, International Search Report dated Jan. 23, 2020", 2 pgs.

"U.S. Appl. No. PCT/US2019/058084, Written Opinion dated Jan. 23, 2020", 7 pgs.

\* cited by examiner

Deleting Rows From Table
200

| Micro-Partition 2 | | | |
|---|---|---|---|
| COLUMN 1 | COLUMN 2 | METADATA NAME | METADATA ROW |
| 1 | value1 | NULL (MP2) | NULL (1) |
| 2 | value2 | NULL (MP2) | NULL (2) |
| 3 | value3 | NULL (MP2) | NULL (3) |
| 4 | value4 | NULL (MP2) | NULL (3) |

Deleting rows 2 and 3

| Micro-Partition 4 | | | |
|---|---|---|---|
| COLUMN 1 | COLUMN 2 | METADATA NAME | METADATA ROW |
| 1 | value1 | MP2 | 1 |
| 4 | value4 | MP2 | 4 |

Delta Information After Delete
210

| DELTA 210 | | | |
|---|---|---|---|
| COLUMN 1 | COLUMN 2 | METADATA ACTION | METADATA IS UPDATE |
| 2 | value2 | DELETE | FALSE |
| 3 | value3 | DELETE | FALSE |

FIG. 2

TRACKING INTERMEDIATE CHANGES IN DATABASE DATA

CROSS-REFERENCE TO RELATED APPLICATION

This application is a Continuation of U.S. patent application Ser. No. 16/182,216, filed on Nov. 6, 2018, the contents of which are incorporated herein in their entirety.

TECHNICAL FIELD

The present disclosure relates systems, methods, and devices for databases and more particularly relates to tracking intermediate changes to database data.

BACKGROUND

Databases are widely used for data storage and access in computing applications. Databases may include one or more tables that include or reference data that can be read, modified, or deleted using queries. Databases can store anywhere from small to extremely large sets of data within one or more tables. This data can be accessed by various users in an organization or even be used to service public users, such as via a website or an application program interface (API). Both computing and storage resources, as well as their underlying architecture, can play a significant role in achieving desirable database performance.

Database data can be modified by various commands, including insert, delete, and update commands that modify one or more rows in a database table. It can be costly to track such modifications and to determine delta information between a first set of database data and a second set of database data. Systems, methods, and devices for efficient tracking of changes made to database data are disclosed herein.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 2 is a block diagram illustrating a delete command performed on a micro-partition of a database, according to one embodiment;

DETAILED DESCRIPTION

Figure 1:
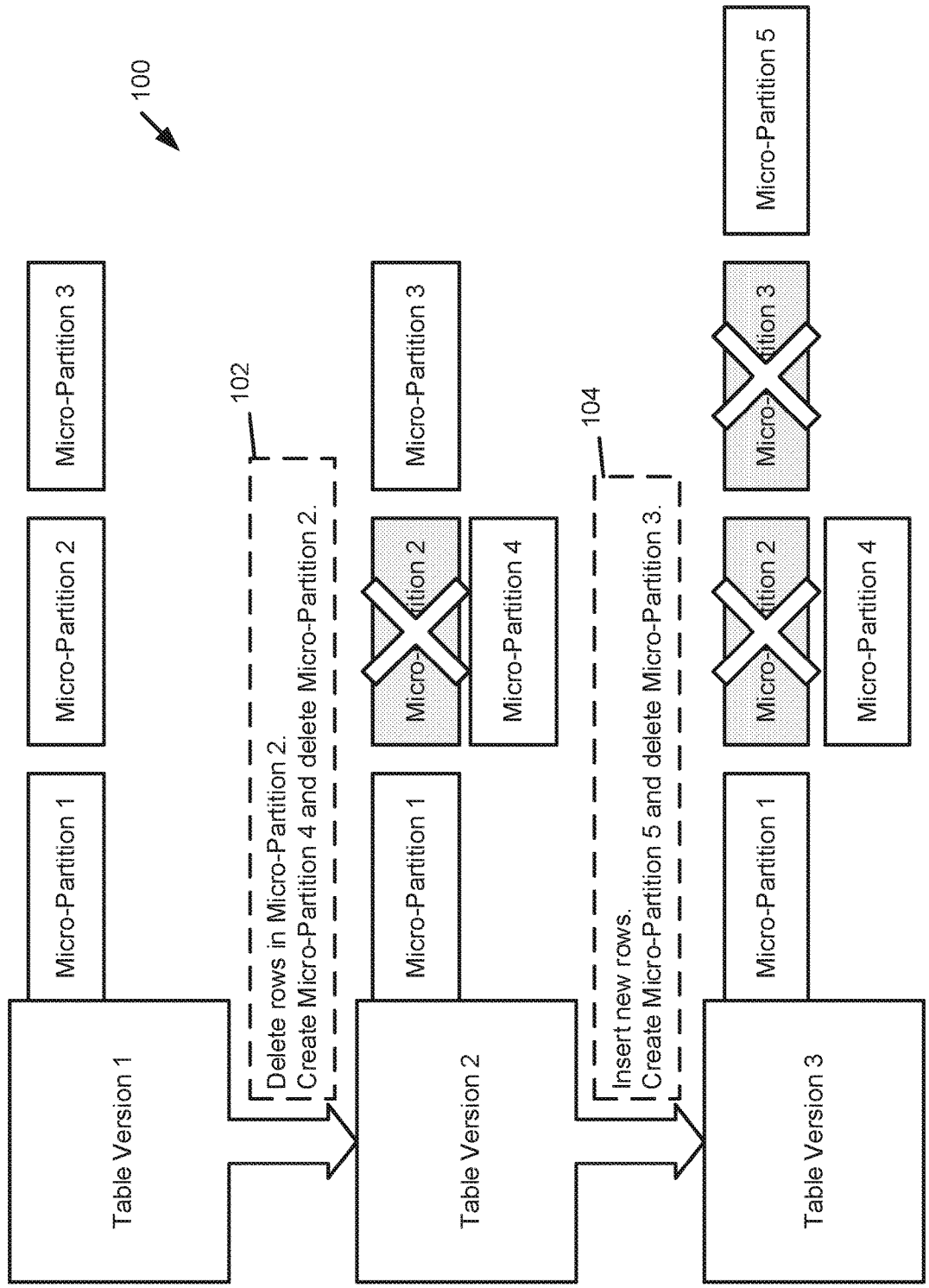
FIG. 1 is a block diagram illustrating modifications made to table versions, according to one embodiment.

Systems, methods, and devices for tracking a series of changes to database data and for returning a comprehensive change tracking summary for a database table are disclosed. Database change tracking can return a summary of what rows have changed in a database table and how those rows have changed. A delta may be returned for a database that indicates which rows have changed and how they have changed between two timestamps and does not include information on all intermediate changes that occurred between the two timestamps. A comprehensive change tracking summary may be returned that indicates how data has changed between two timestamps and includes all intermediate changes that occurred between the first timestamp and the second timestamp.

Change tracking is historically very costly and requires significant resources and storage capacity. Database systems are traditionally built using a transaction log that embodies all changes made in the database. The transactional log is normally used to make transactional changes atomic and durable and may further be used in recover in an instance where the database system crashes and information must be restored. The transactional includes all changes that have occurred on the database and may be used to reconstruct those changes. However, the transactional log approach requires significant system resource because items must be stored using a scan of the log because there is no random-access storage structure to speed up the process of reconstructing the database. Further, the transactional log itself is physical and must be parsed and applied to a page structure to provide whole row images and changes.

In an alternative approach known in the art, temporal information about data changes may be stored in two transactional timestamp columns within a database table. The transactional timestamp columns indicate transactional times when a row was valid. An internal history table may be generated that stores updated data information with the timestamps from the transactional timestamp columns. Updates and deletes copy the values of changed rows into the internal history table and update the transactional timestamp columns to mark the valid transactional lifetime of rows. When the historical or changed data set is required, a current table and the internal history table must be joined to gather the delta or historical information between two transactional time points. The maintenance of the transactional timestamp columns and the internal history table adds significant overhead to the database transactions. Additionally, delta queries must join the information from two tables when requested.

A comprehensive change tracking summary is historically generated by determining a modification that has occurred between all sequential pairs of transactions that occur on the table. For example, a modification will be determined between a timestamp zero and a timestamp one; a change will be determined between a timestamp one and a timestamp two; a change will be determined between a timestamp two and a timestamp three, and so forth. The modifications may be determined by comparing the data within the table at the timestamp zero and at the timestamp one, and so forth for each sequential pair of transactions in a relevant time period. This can require enormous sums of data to be stored in the database and can be extremely costly and time intensive to perform. The series of modification may then be reported to indicate all modifications that occurred on the table in a relevant time period where such modification includes, for example, updates, deletes, inserts, or merges on the database data.

Systems, methods, and devices disclosed herein provide a low-cost means for generating a comprehensive change tracking summary that includes all modifications that have occurred on a database table in a relevant time period. Such systems, methods, and devices enable a single query to be run on transactional information to return a comprehensive listing of modifications that have occurred on a table. This significantly reduces the storage capacity and computing resources that are required for analyzing database transactions and/or modifications over a time period.

A database table may be altered in response to a data manipulation (DML) statement such as an insert command, a delete command, an update command, a merge command, and so forth. Such modifications may be referred to as a transaction that occurred on the database table. In an embodiment, each transaction includes a timestamp indicating when the transaction was received and/or when the transaction was fully executed. In an embodiment, a transaction includes multiple alterations made to a table, and such alterations may impact one or more micro-partitions in the table.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for generating a comprehensive change tracking summary that indicates all intermediate changes that have been made to a table between a first timestamp and a second timestamp.

Change tracking information can be stored as metadata in a database. This metadata describes the data that is stored in database tables of customers but is not actually the stored table data. Metadata can get very large, especially if there are large database tables of many customers. Current database systems have severe limitations handling large amounts of metadata. Current database systems store metadata in mutable storage devices and services, including main memory, file systems, and key-value stores. These devices and services allow the metadata to be updated data in-place. If a data record changes, it may be updated with the new information and the old information is overwritten. This allows databases to easily maintain mutable metadata by updating metadata in-place.

However, these mutable storage devices and services have limitations. The limitations are at least two-fold. First, mutable storage devices such as main memory and file systems have a hard limit in terms of storage capacity. If the size of the metadata exceeds these limits, it is impossible to store more metadata there. Second, mutable storage services such as key-value stores perform poorly when reading large volumes of metadata. Reading data is performed using range scans, which take a long time to finish. In practice, range scans can take many minutes or even approach an hour to complete in large scale deployments.

These limitations make it impossible to store large amounts of metadata in existing mutable storage devices and services. Systems, methods, and devices disclosed herein provide for improved metadata storage and management that includes storing metadata in immutable (non-mutable) storage such as micro-partitions. As used herein, immutable or non-mutable storage includes storage where data cannot or is not permitted to be overwritten or updated in-place. For example, changes to data that is located in a cell or region of storage media may be stored as a new file in a different, time-stamped, cell or region of the storage media. Mutable storage may include storage where data is permitted to be overwritten or updated in-place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3®, Microsoft Azure Blob Storage®, and Google Cloud Storage®. Many of these services do not allow to update data in-place (i.e., are non-mutable or immutable). Data files may only be added or deleted, but never updated. In one embodiment, storing and maintaining metadata on these services requires that, for every change in metadata, a metadata file is added to the storage service. These metadata files may be periodically consolidated into larger "compacted" or consolidated metadata files in the background.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

In an embodiment, a method for tracking intermediate changes to database data is disclosed. The method includes executing a transaction to modify data in a micro-partition of a table of a database by generating a new micro-partition that embodies the transaction. The method includes associating transaction data with the new micro-partition, wherein the transaction data comprises a timestamp when the transaction was fully executed. The method includes associating modification data with the new micro-partition that comprises an indication of one or more rows of the table that were modified by the transaction. The method includes joining the transaction data with the modification data to generate joined data. The method includes querying the joined data to determine a listing of intermediate modifications made to the table between a first timestamp and a second timestamp.

In an embodiment, the transaction data includes information on the transaction that caused the new micro-partition to be generated. In an implementation where a plurality of new micro-partitions is generated based on one transaction, the transaction data will be associated with each of the new micro-partitions. The transaction data includes, for example, an identity of a user or account that initiated the transaction, a timestamp when the transaction was requested, a timestamp when execution of the transaction began, a timestamp when execution of the transaction was completed, a listing of all rows that were modified by the transaction and how those rows were modified, a listing of micro-partitions that were generated and/or removed based on the transaction, and any other suitable information relevant to the transaction. The transaction data may be stored within the new micro-partition as metadata.

In an embodiment, the modification data includes information on what rows were modified by a transaction, what micro-partitions were modified by a transaction, how the rows and/or micro-partitions were modified by the transaction, information on prior modifications on the table, and so forth. The modification data may include a lineage of modifications made on the table since the table was initially generated, or since a particular time. The modification data may include a listing of table versions of the table, including all micro-partitions that are currently part of or were historically part of the table. The modification data may be stored within the new micro-partition as metadata.

In an embodiment, the transaction data and the modification data are joined to generate joined data. The joined data indicates at least (a) what transaction caused a modification to the table; and (b) how the table was modified. The joined data may be queried to determine a listing of intermediate modifications that have been made to the table between a first timestamp and a second timestamp. The listing of intermediate modifications may include a listing of all transactions that have been executed on the table and how those transactions modified the table. The listing of intermediate modifications includes table modifications that are later reversed by subsequent transactions between the first timestamp and the second timestamp.

Querying the listing of intermediate modifications provides an efficient and low-cost means for determining a comprehensive listing of incremental changes made to a database table between two points in time. This is superior to methods known in the art where each of a series of subsequent table versions must be manually compared to determine how the table has been modified over time. Such methods known in the art require extensive storage resources and computing resources to execute.

In an embodiment, a table version history is generated and includes one or more change tracking columns stored within the micro-partition and/or the new micro-partition. The one or more change tracking columns may include information indicating one or more of: a prior micro-partition name for a row value, a prior row identification for a row value, an action taken on a row value, whether a row value was updated, a log of changes made to a row or row value, a lineage for a row indicating one or more changes made to the row over a time period, a listing of transactions that have initiated a modification to a row, and any other suitable information that may indicate change made to a row or micro-partition or a historical listing of changes that have been made to a row or micro-partition in a table.

In an embodiment, file metadata is stored within metadata storage. The file metadata contains table versions and information about each table data file. The metadata storage may include mutable storage (storage that can be over written or written in-place), such as a local file system, system, memory, or the like. In one embodiment, the micro-partition metadata consists of two data sets: table versions and file information. The table versions data set includes a mapping of table versions to lists of added files and removed files. File information consists of information about each micro-partition, including micro-partition path, micro-partition size, micro-partition key id, and summaries of all rows and columns that are stored in the micro-partition, for example. Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

FIG. 1 illustrates a schematic block diagram of a table history 100 with multiple table versions. The example table history 100 illustrates three table versions, namely table version 1, table version 2, and table version 3. Table version 1 includes data in the form of three micro-partitions (MPs), namely micro-partition 1 (MP1), micro-partition 2 (MP2), and micro-partition 3 (MP3). A first transaction 102 is executed on table version 1 to generate table version 2. The first transaction 102 includes deleting rows in MP2 to generate a new micro-partition 4 (MP4) and deleting the original MP2. The first transaction 102 executed on table version 1 generates table version 2 which includes the original MP1 and MP3 along with the newly generated MP4. As a result of the first transaction 102, MP2 has been removed from the table as reflected in table version 2. A second transaction 104 is executed on table version 2 to generate table version 3. The second transaction 104 includes inserting new rows such that micro-partition 5 (MP5) is generated and MP3 is removed from the table. Table version 3 includes the original MP1, the MP4 generated as a result of the first transaction 102, and MP5 generated as a result of the second transaction 104. The MP2 was removed as a result of the first transaction 102 and the MP3 was removed from the table as a result of the second transaction 104.

As illustrated in FIG. 1, a database table may store database data in one or more micro-partitions, wherein the micro-partitions constitute immutable storage devices. When a change or modification is executed on the table, the affected micro-partitions are removed, and new micro-partitions are created that reflect the change. In an embodiment, the original unmodified micro-partition is not removed but is also stored with the new micro-partition. The change may include any command that impacts one or more rows in the table, including for example, a delete command, an insert command, an update command, and/or a merge command.

In an embodiment, a comprehensive change tracking summary may be determined that indicates all changes that have been made between, for example, table version 1 and table version 3. A comprehensive change tracking summary for the implementation illustrated in FIG. 1 will indicate that a first transaction 102 caused rows to be deleted from MP2 and caused MP4 to be generated without those rows. The summary will further indicate that a second transaction 104 caused new rows to be inserted into the table, caused MP3 to be removed, and caused MP5 to be generated with those new rows. The comprehensive change tracking summary indicates all transactions that occur on the table, when those transactions occurred, and how those transactions impacted the table.

In an embodiment, a table history is updated only if a transaction is fully completed. Therefore, if a transaction is initiated but is not fully completed, the table history will not be updated to include that transaction. For example, if a transaction is initiated to delete certain rows of an original micro-partition, a new micro-partition will be generated that includes all original rows in the original micro-partition except for those that should be deleted based on a delete command. If the transaction is not completed, i.e. if the new micro-partition is not fully generated, then the table history will not be updated to indicate that the transaction occurred.

In an embodiment, the table history is stored in a metadata column that includes a micro-partition lineage storing a lineage of micro-partition names over a time period. The metadata column may further include a row lineage storing a lineage of ordinal numbers for a given row over a time period. Such values are NULL when a table is first created or when a new row is generated within the table. When a new row is generated, the stored values will be NULL, and the actual logical value may be derived from the name of the micro-partition that the row is stored within and the rank of the row within that micro-partition.

In an embodiment, when a row is copied into a new micro-partition as part of a DML query execution, and if the value for the row is NULL, the lineage of the row is materialized by replacing the value with the applicable micro-partition name and the applicable rank of the row within that micro-partition. When a row is copied into a new micro-partition and the value of the row is not NULL, the name of the row is copied over into the new micro-partition.

Figure 3:
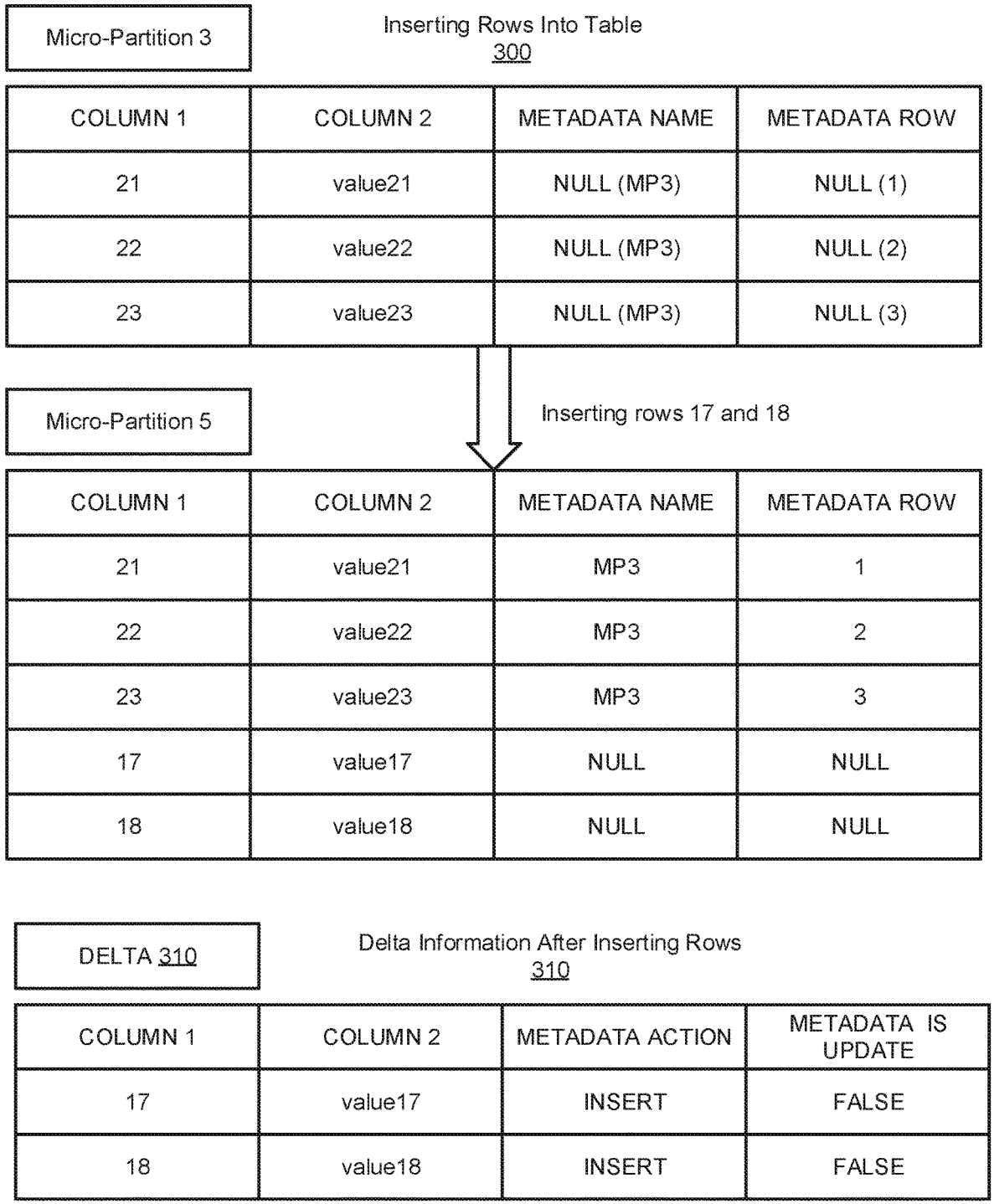
FIG. 3 is a block diagram illustrating an insert command performed on a micro-partition of a database, according to one embodiment.
Figure 4:
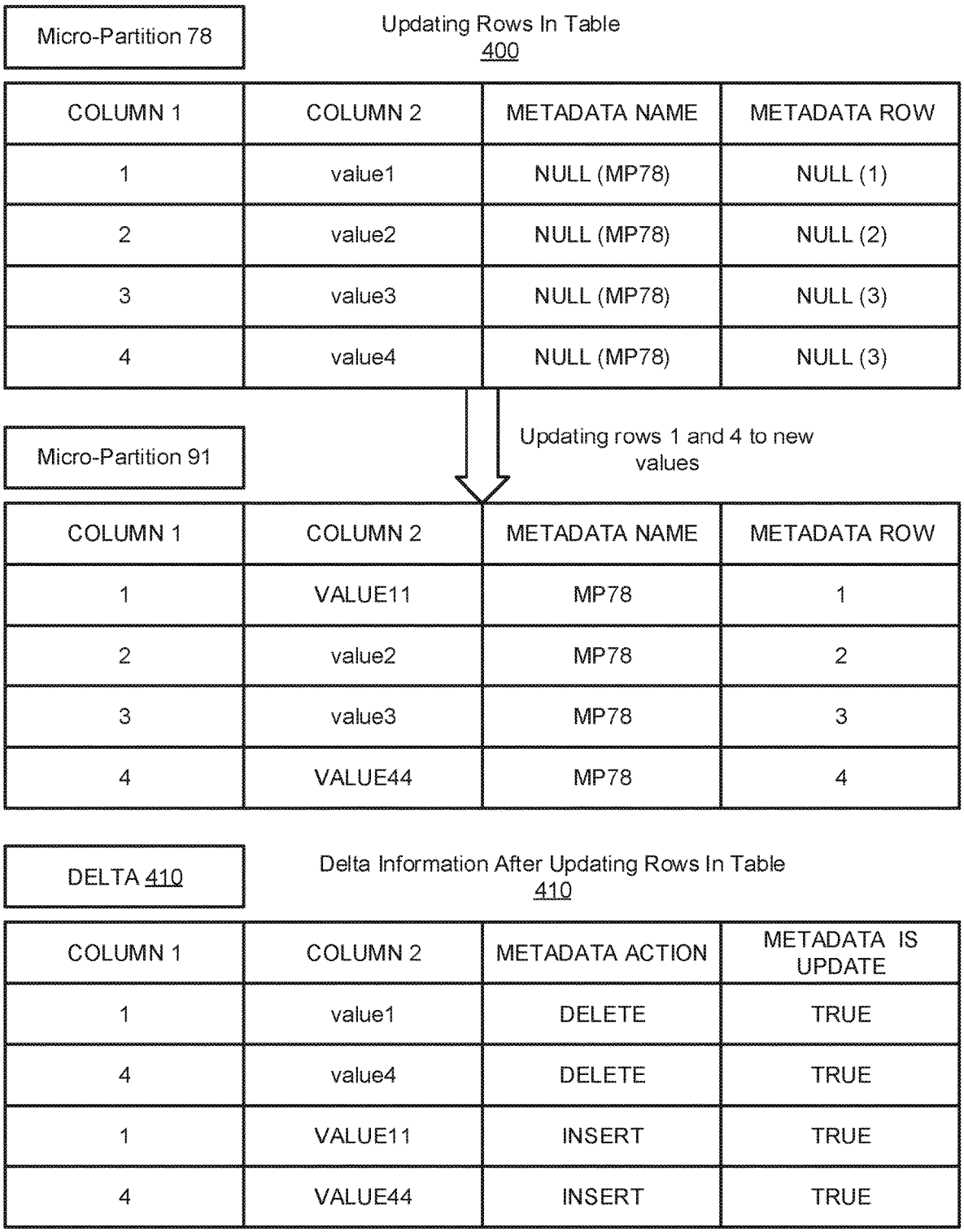
FIG. 4 is a block diagram illustrating an update command performed on a micro-partition of a database, according to one embodiment.

FIGS. 2-4 illustrate exemplary embodiments of delete, insert, and update commands that may be executed on a database table. It should be appreciated that the table schemas illustrated in FIGS. 2-4 are illustrative and include simple values to represent rows and columns that may be included in a database table.

FIG. 2 illustrates a block diagram of an example delete command 200 and a resulting delta 210 that may be returned after the delete command 200 is complete. Micro-partition 2 (MP2) as illustrated in FIG. 2 includes four columns. Column 1 includes entries for row numbers that are primarily used for identification purposes. Column 2 includes entries for row values that may include any value depending on the subject or purpose of the database table. The metadata name column includes table history information about which micro-partition the data originated from or was last located within. The metadata row column includes table history information about which row the data originated from or was located within.

As illustrated in FIG. 2, the delete command 200 is performed on MP2 and deletes rows 2 and 3 from MP2 to generate the new MP4. As an example, as illustrated in FIG. 2, MP2 includes four rows—namely rows 1, 2, 3, and 4. It should be appreciated that a micro-partition may include any number of rows and may often include thousands of rows in a single micro-partition. The values for each of the rows in MP2 are listed as value1, value2, value3, and value4 for the four rows by way of example but it should be appreciated the value may include any suitable value as pertinent to the database. In the original and unmodified MP2, the metadata name for each of the four rows is "NULL (MP2)" indicating the data is original to that micro-partition and does not yet have any change history. Similarly, the metadata row column for MP2 is NULL and indicates the original row number because the data is original to MP2 and does not yet have a change tracking history.

MP4 is generated based on the delete command 200 performed on MP2 that deleted rows 2 and 3 as illustrated in FIG. 2. MP4 now only includes rows 1 and 4 having values value1 and value4, respectively. The metadata name for each of rows 1 and 4 is "MP2" indicating the row data originated or was last located within MP2. The metadata row for each of rows 1 and 4 is 1 and 4, respectively, indicating where the rows were last located.

A delta 210 may be determined after the delete command 200 is performed on a table. In an embodiment, a timestamp is attached to each transaction that occurs on the table. If the transaction is fully completed, then the timestamp is further attached to the change tracking history for that transaction. Attaching the timestamp to the change tracking history enables the system to know when a table was changed by a certain transaction and when a certain change occurred on any of a plurality of rows in the table.

The delta 210 illustrated in FIG. 2 determines a difference or a change that occurred between MP2 and MP4. In various embodiments the delta 210 may determine a total change that has occurred between any two timestamps, even if many transactions have occurred on the data between those two timestamps and the data has been changed multiple times. The delta 210 provides an indication of a total change between two timestamps without providing information on any intermediate changes that occurred between a first timestamp and a second timestamp.

The delta 210 includes four columns, namely a column 1 and column 2 (similar to those shown in MP2 and MP4) along with a metadata action column and a metadata is update column. Column 1 indicates that rows 2 and 3 have been altered between the first timestamp and the second timestamp. Column 2 indicates that the values of rows 2 and 3 are value2 and value3, respectively. In various embodiments, where the values of rows 2 and 3 may have changed one or more times between the first timestamp and the second timestamp, Column 2 may indicate the original value or the most recent value. The metadata action column indicates that rows 2 and 3 underwent a DELETE command. The metadata is update column indicates whether the metadata was updated. In the delta 210 illustrated in FIG. 2, the metadata is update column returns a FALSE because the rows did not undergo an update (but were instead deleted).

In an embodiment, a table history is generated that includes all transactions that have been initiated against the table. Such transactions may include, for example, data manipulation language (DML) commands such as delete, insert, merge, or update commands initiated on a micro-partition. The table history may be dynamically updated to reflect all deleted or inserted rows on table for an interval of transaction time. The table history may include a list of DML statements sorted by transaction time, where each transaction includes a timestamp. In an embodiment, it is assumed that all DML statements will delete, insert, and/or update rows at the same time.

In an embodiment, a table history may be determined by retrieving a list of added and removed micro-partitions between two transactions. For each given micro-partition, a lineage sequence of dependencies may be generated that indicates which rows have been updated, how those rows were updated, and what transaction caused each update. A delta may be determined by requesting a changeset between two timestamps in the lineage. The delta may return a listing of all added micro-partitions and all removed micro-partitions between the two timestamps. The listing may be consolidated by removing those micro-partitions that appear on both the list of added micro-partitions and on the list of removed micro-partitions. This may be accomplished by performing anti-join on the lists of added and removed micro-partitions.

In an embodiment, the row granularity changes between added and removed micro-partitions is determined. In such an embodiment, a full outer join is performed between a rowset of added micro-partitions and a rowset of removed micro-partitions on a metadata partition and metadata row number columns. When the resulting joined rowset includes NULL values for the metadata columns in the data from the added rowset, this indicates those rows represent DELETEs. If the values for the metadata columns in the data from the inserted rowset are NULL, this indicates those rows represent INSERTs. If the metadata columns originating from the added and removed rowsets are both NULL, this indicates the rows were potentially updated, and comparing the original data columns will result in the information indicating whether the rows were actually modified.

Further in an embodiment, a row granularity list of changes may be determined between any two transaction times for a given table. A side-by-side representation may be generated that may be easily used in a merge statement by checking which part of data is present. A table valued function may be utilized to query the table history for a given table (or a materialized view). Further, a SQL statement may be utilized by referring the INSERTED or DELETED columns in a changeset to return an indication of which rows in the table have been inserted or deleted.

FIG. 3 illustrates a block diagram of an example insert command 300 and a resulting delta 310 that may be returned after the insert command 300 is complete. FIG. 3 begins with an exemplary micro-partition 3 (MP3) that undergoes an insert command 300 to generate micro-partition 5 (MP5). The insert command 300 inserts rows 17 and 18 into MP3. As an example, embodiment, MP3 includes three rows, namely rows 21, 22, and 23 having values of value21, value22, and value23, respectively. The metadata name is NULL (MP3) for each of the three rows because there is not yet a change tracking history for the rows that indicates where the rows originated or were last stored. NULL( ) notation indicates that the values for the metadata columns are NULL when rows are first inserted into the table. The NULL( ) notation can reduce overhead. When values for a row are copied into a new micro-partition, the rank of the row is notated in the NULL( ) notation, such that the first row is NULL(1), the second row is NULL(2), the third row is NULL(3), and so forth.

MP5 is generated based on the insert command 300 and now includes rows 17 and 18. The values for rows 17 and 18 are value17 and value 18, respectively, because rows 17 and 18 were inserted into MP5 and those are the assigned values for the rows. The values for rows 21, 22, and 23 have not changed. The metadata name information for rows 21, 22, and 23 is "MP3" because the data originated from or was last stored in micro-partition 3. The metadata row information for rows 21, 22, and 23 is 1, 2, and 3, respectively, because rows 21, 22, and 23 were originally or last stored in rows 1, 2, and 3 in micro-partition 3. The metadata name information and the metadata row information for rows 17 and 18 is "NULL" because the rows originated in MP5 and do not yet have any change tracking history information.

The delta 310 for the insert command 300 illustrates the total change made between a first timestamp and a second timestamp. As illustrated in FIG. 2, the delta 310 illustrates the change that occurred between MP5 and MP3. It should be appreciated that in alternative embodiments or implementations, a delta may indicate a total change or modification that occurred on a table between any two timestamps without indicating incremental changes that occurred on the table.

The delta 310 includes rows 17 and 18 having value17 and value18, respectively because rows 17 and 18 were added to MP3 because of the insert command 300. The metadata action is "INSERT" for rows 17 and 18 because an insert command 300 was the transaction that caused a modification to the rows. The metadata is update information is "FALSE" for rows 17 and 18 because the rows were not updated but were instead inserted.

FIG. 4 illustrates a block diagram of an example update command 400 and a resulting delta 410 that may be returned after the update command 400 is complete. In the example embodiment illustrated in FIG. 4, micro-partition 78 (MP78) is updated to generate micro-partition 91 (MP91). The update command 400 updates rows 1 and 4 to new values. MP78 includes rows 1, 2, 3, and 4 having values of value1, value2, value3, and value4, respectively. The metadata name information is "NULL (MP78) for each of the rows because there is not yet change tracking history for the rows indicating where the rows were last stored. The metadata row information for each of the rows is NULL because there is not yet change tracking history for the rows indicating which row the values were last stored.

MP91 includes rows 1, 2, 3, and 4. However, due to the update command 400, row 1 now has a value of VALUE11 and row 4 now has a value of VALUE44. The metadata name information for each of rows 1, 2, 3, and 4 is "MP78" because the values originated from or were last stored in MP78. The metadata row information for rows 1 is "1" because that value was last stored in row 1 in MP78. Similarly, for rows 2, 3, and 4, the metadata row information is "2", "3", and "4", respectively. When rows 1, 2, 3, and 4 were copied over to the new MP91 the ordinal position (also referred to as "rank") of the rows was also copied over from the original MP78.

The delta 410 indicates the change between a first timestamp and a second timestamp. As illustrated in FIG. 4, the delta 410 indicates a total change between MP78 and MP91 due to the update command 400. The delta 410 indicates that rows 1 and 4 that had a value of "value1" and "value2", respectively, were deleted. The delta 410 indicates that rows 1 and 4 that have a value of "VALUE 11" and "VALUE44", respectively, were inserted. The metadata is update information is "TRUE" for all rows because an update command 400 was performed on the rows. As indicated in the delta 410, when an update command is performed, the original row is deleted, and a new row is inserted to carry out the command.

In an embodiment, each delta 210, 310, 410 may be utilized to determine a comprehensive change tracking summary for a table between a first timestamp and a second timestamp. The delta information may be stored as metadata in a change tracking column in each new micro-partition that is generated in the table. The delta information may be queried to determine the comprehensive change tracking summary for the table.

Figure 5:
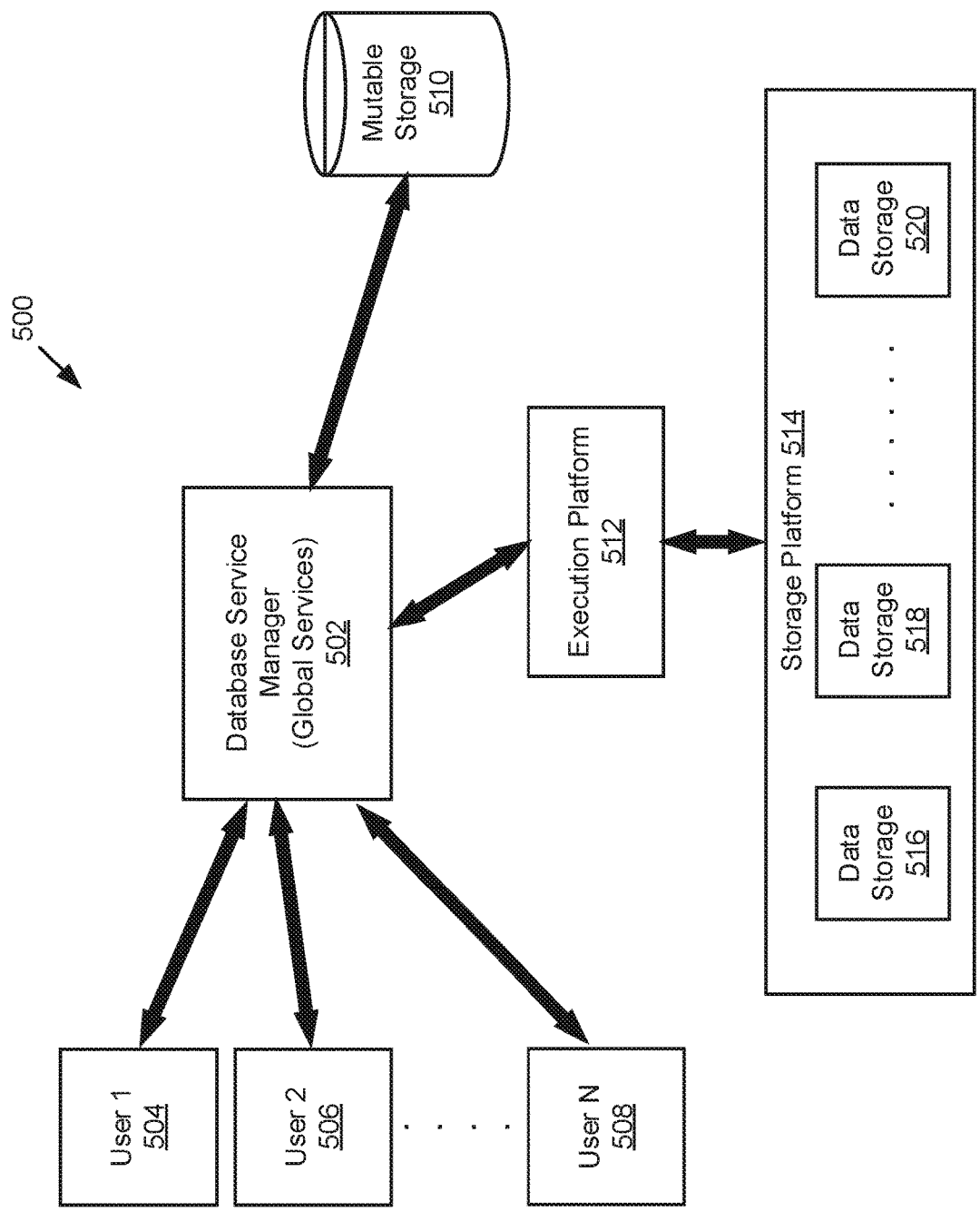
FIG. 5 is a block diagram illustrating a database system having a database service manager, according to one embodiment.

Turning to FIG. 5, a block diagram is shown illustrating a processing platform 500 for providing database services, according to one embodiment. The processing platform 500 includes a database service manager 502 that is accessible by multiple users 504, 506, and 508. The database service manager 502 may also be referred to herein as a resource manager or global services. In some implementations, database service manager 502 can support any number of users desiring access to data or services of the processing platform 500. Users 504-508 may include, for example, end users providing data storage and retrieval queries and requests, system administrators managing the systems and methods described herein, software applications that interact with a database, and other components/devices that interact with database service manager 502. In a particular embodiment as illustrated herein, the users 504-508 may initiate changes to database data and may request a delta for a database table.

The database service manager 502 may provide various services and functions that support the operation of the systems and components within the processing platform 500. Database service manager 502 has access to stored metadata associated with the data stored throughout data processing platform 500. The database service manager 502 may use the metadata for optimizing user queries. In some embodiments, metadata includes a summary of data stored in remote data storage systems as well as data available from a local cache (e.g., a cache within one or more of the clusters of the execution platform 512). Additionally, metadata may include information regarding how data is organized in the remote data storage systems and the local caches. Metadata allows systems and services to determine whether a piece of data needs to be processed without loading or accessing the actual data from a storage device.

As part of the data processing platform 500, metadata may be collected when changes are made to the data using a data manipulation language (DML), which changes may be made by way of any DML statement. Examples of manipulating data may include, but are not limited to, selecting, updating, changing, merging, and inserting data into tables. As part of the processing platform 500, micro-partitions may be created, and the metadata may be collected on a per file and a per column basis. This collection of metadata may be performed during data ingestion or the collection of metadata may be performed as a separate process after the data is ingested or loaded. In an implementation, the metadata may include a number of distinct values; a number of null values; and a minimum value and a maximum value for each file. In an implementation, the metadata may further include string length information and ranges of characters in strings.

In one embodiment, at least a portion of the metadata is stored in immutable storage such as a micro-partition. For example, the metadata may be stored on the storage platform 514 along with table data. In one embodiment, the same or separate cloud storage resources that are used for table data may be allocated and used for the metadata. In one embodiment, the metadata may be stored in local immutable storage. In one embodiment, information about the metadata in immutable storage, or information about metadata files stored in immutable storage, is stored in mutable storage 510. The information about metadata may be referenced for locating and accessing the metadata stored in immutable storage. In one embodiment, systems with metadata storage may be restructured such that the metadata storage is used instead to store information about metadata files located in immutable storage.

Database service manager 502 is further in communication with an execution platform 512, which provides computing resources that execute various data storage and data retrieval operations. The execution platform 512 may include one or more compute clusters. The execution platform 512 is in communication with one or more data storage devices 516, 518, and 520 that are part of a storage platform 514. Although three data storage devices 516, 518, and 520 are shown in FIG. 5, the execution platform 512 is capable of communicating with any number of data storage devices. In some embodiments, data storage devices 516, 518, and 520 are cloud-based storage devices located in one or more geographic locations. For example, data storage devices 516, 518, and 520 may be part of a public cloud infrastructure or a private cloud infrastructure, or any other manner of distributed storage system. Data storage devices 516, 518, and 520 may include hard disk drives (HDDs), solid state drives (SSDs), storage clusters, or any other data storage technology. Additionally, the storage platform 514 may include a distributed file system (such as Hadoop Distributed File Systems (HDFS), object storage systems, and the like.

In some embodiments, the communication links between database service manager 502 and users 504-508, mutable storage 510 for information about metadata files (i.e., metadata file metadata), and execution platform 512 are implemented via one or more data communication networks and may be assigned various tasks such that user requests can be optimized. Similarly, the communication links between execution platform 512 and data storage devices 516-520 in storage platform 514 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The database service manager 502, mutable storage 510, execution platform 512, and storage platform 514 are shown in FIG. 5 as individual components. However, each of database service manager 502, mutable storage 510, execution platform 512, and storage platform 514 may be implemented as a distributed system (e.g., distributed across multiple systems/platforms at multiple geographic locations) or may be combined into one or more systems. Additionally, each of the database service manager 502, mutable storage 510, the execution platform 512, and the storage platform 514 may be scaled up or down (independently of one another) depending on changes to the requests received from users 504-508 and the changing needs of the data processing platform 500. Thus, in the described embodiments, the data processing platform 500 is dynamic and supports regular changes to meet the current data processing needs.

Figure 6:
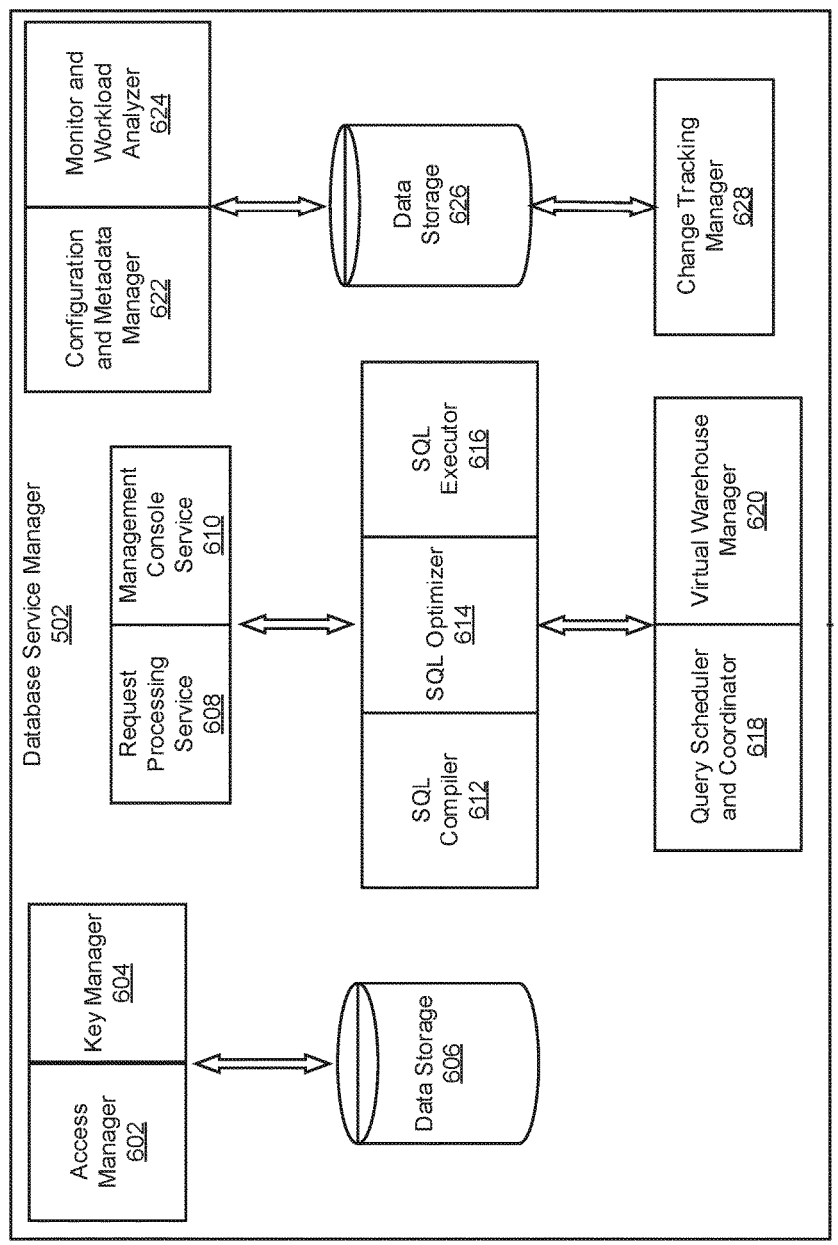
FIG. 6 is a block diagram illustrating components of a database service manager, according to one embodiment.

FIG. 6 illustrates a block diagram depicting components of database service manager 502, according to one embodiment. The database service manager 502 includes an access manager 602 and a key manager 604 coupled to a data storage device 606. The access manager 602 handles authentication and authorization tasks for the systems described herein. The key manager 604 manages storage and authentication of keys used during authentication and authorization tasks. A request processing service 608 manages received data storage requests and data retrieval requests. A management console service 610 supports access to various systems and processes by administrators and other system managers.

The database service manager 502 also includes an SQL compiler 612, an SQL optimizer 614 and an SQL executor 616. SQL compiler 612 parses SQL queries and generates the execution code for the queries. SQL optimizer 614 determines the best method to execute queries based on the data that needs to be processed. SQL executor 616 executes the query code for queries received by database service manager 502. A query scheduler and coordinator 618 sends received queries to the appropriate services or systems for compilation, optimization, and dispatch to an execution platform 612. A virtual warehouse manager 620 manages the operation of multiple virtual warehouses.

Additionally, the database service manager 502 includes a change tracking manager 628, which manages the information related to the data stored in the remote data storage devices and in the local caches. A monitor and workload analyzer 624 oversees the processes performed by the database service manager 502 and manages the distribution of tasks (e.g., workload) across the virtual warehouses and execution nodes in the execution platform 512. Change tracking manager 628 and monitor and workload analyzer 624 are coupled to a data storage device 626. In one embodiment, the configuration and metadata manger 622 collects, stores, and manages metadata in an immutable storage resource. In one embodiment, updates to metadata result in new files and are not updated in place.

Metadata files, as discussed herein, may include files that contain metadata of modifications (e.g., each modification) to any database table in a data warehouse. A modification of a database table may generate one or more metadata files, often just a single metadata file. In one embodiment, metadata files contain the following information: information about a metadata file, including a version number; a list of all added table data files; a list of deleted table data files; and information about each added table data file, including file path, file size, file key id, as well as summaries of all rows and columns that are stored in the table data file.

In one embodiment, the contents of metadata files may vary over time. If format or content of a metadata file changes, the version number of the metadata file may be incremented. In one embodiment, the metadata store (or other mutable data storage resource) only stores information about metadata files (which are stored in immutable storage), not about table data files. In practice, information about metadata files stored in in the metadata store (or other mutable storage) is very limited and may contain data for thousands of metadata files. In one embodiment, information for up to 30,000 metadata files may be stored in metadata store or other mutable storage. This dramatically reduces the amount of storage needed in the metadata store or other mutable storage.

In one embodiment, a system writes metadata files to cloud storage for every modification of a database table (e.g., modification of table data files). In addition to adding and deleting files, every modification to a database table in the data warehouse also generates one or more metadata files. Typically, a modification creates a single metadata file. However, if the modification to the table is large (e.g., an insert into a table that produces very many files), it may result in the creation of multiple metadata files. Further operation of the change tracking manager 628 will be discussed further in relation to FIGS. 6-12.

The database service manager 502 also includes a change tracking manager 628, which manages the generation of change tracking history such as one or more change tracking columns stored in a table. The change tracking manager 628 further manages the generation of a delta report indicating a total change that has occurred on a database table between a first timestamp and a second timestamp. Because multiple users/systems may access the same data simultaneously, changes to the data may be synchronized to ensure that each user/system is working with the current version of the data and has access to a change tracking history for the data.

Security improvements are also implemented in some embodiments. In one embodiment, metadata files and change tracking information is encrypted using individual file keys. Within a micro-partition, columns may be encrypted individually using AES-CTR mode with different start counters. This allows a database system to read an individual column from a micro-partition because it can be decrypted without needing to decrypt the whole micro-partition at once. Encryption improves security because nobody can read the micro-partition without having the proper file key.

For verification that a micro-partition has not been altered, the system may store hashes of columns for each column within the micro-partition. Before decrypting the data, the system compares the hash of the encrypted column with the stored hash of the column of this micro-partition. If the hashes do not match, the micro-partition must have been altered. This improves security because all altering of micro-partitions is detected by the database system.

Figure 7:
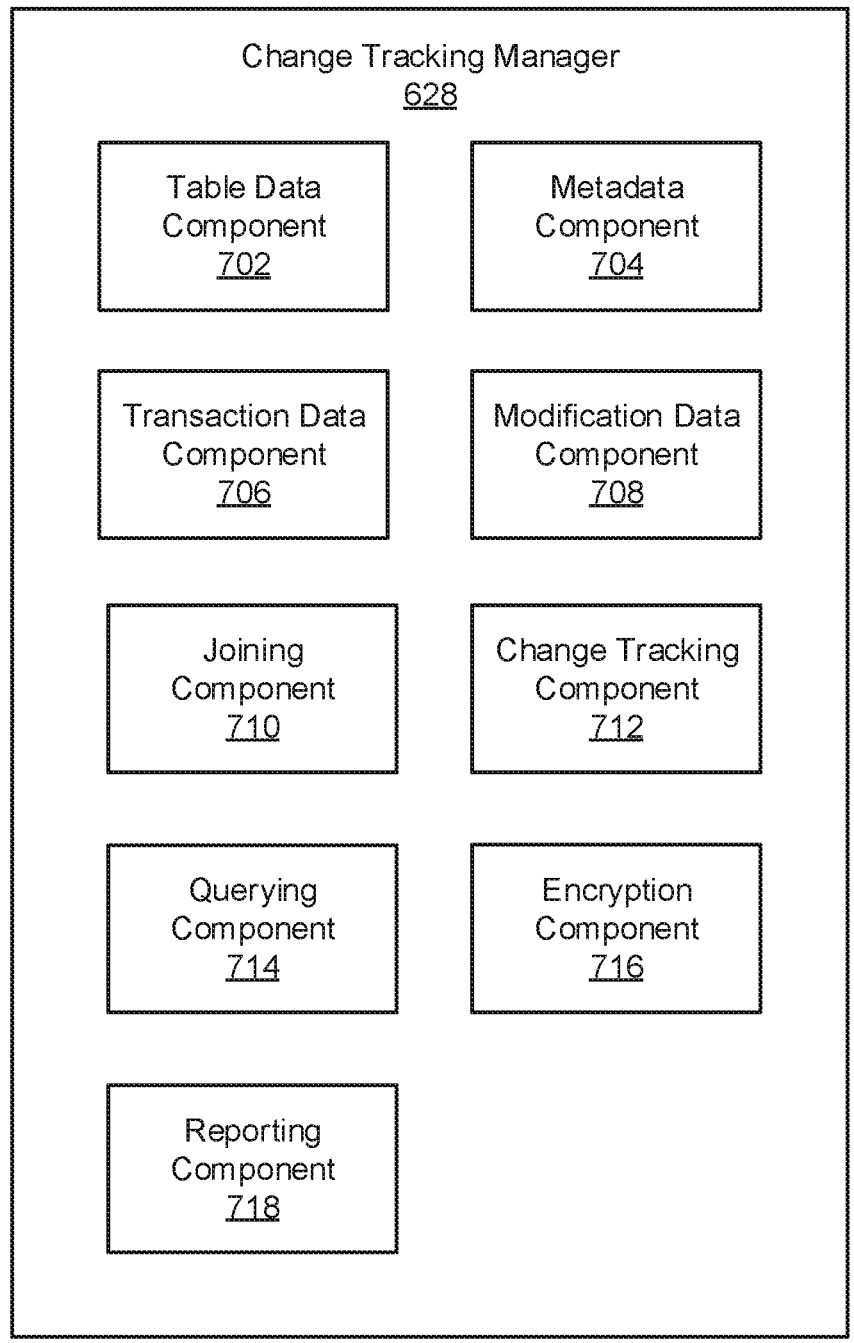
FIG. 7 is a block diagram illustrating components of a change tracking manager, according to one embodiment.

FIG. 7 is a schematic block diagram illustrating components of a change tracking manager 628, according to one embodiment. The change tracking manager 628 may collect, store, and manage metadata about table data files (i.e. micro-partitions) as well as metadata about metadata files. Such metadata includes change tracking information or a table history including a log of changes that have occurred on a table. The change tracking manager 628 includes a table data component 702, a metadata component 704, a transaction data component 706, a modification data component 708, a joining component 710, a change tracking component 712, a querying component 714, an encryption component 716, and a reporting component 718. The components 702-718 are given by way of illustration only and may not all be included in all embodiments. In fact, some embodiments may include only one or any combination of two or more of the components 702-718. For example, some of the components may be located outside or separate from the change tracking manager 628, such as within a database service manager 502 or processing platform 500. Furthermore, the components 702-718 may comprise hardware, computer readable instructions, or a combination of both to perform the functionality and provide the structures discussed herein.

The table data component 702 stores table data for a database, the table data includes information in rows and columns of one or more database tables. The table data component 702 may store table data in micro-partitions within a storage resource. Example storage resources include cloud storage and/or immutable storage. In one embodiment, the storage resources for storage of table data files may be dynamically allocated to accommodate increases or decreases in storage requirement. The table data component 702 may manage and store table data by causing the data to be stored or updated in a remote resource, such as a cloud storage resource or service.

The metadata component 704 stores metadata on immutable storage such as a micro-partition. The metadata may include information about or describing the table data for the database stored by the table data component 702. In one embodiment, the metadata files may include metadata such as an indication of added or deleted table data files. The metadata may include file information for table data files, the file information including one or more of a file name and a storage location. In one embodiment, the metadata may be stored in files on the same cloud storage resources as the table data. In one embodiment, metadata component 704 may cause the metadata to be stored within metadata files in a column-by-column format in remote cloud storage.

The metadata component 704 may also collect and manage storage of metadata within metadata files on the immutable storage. The metadata component 704 may create, in response to a change in the table data, a new metadata file in the immutable storage without modifying previous metadata files. The new metadata file may include metadata indicating the change in the table data. In one embodiment, the metadata in the new metadata file indicates an addition or a deletion of a table data file comprising the table data. The metadata component 704 may also delete expired metadata files. Expired metadata files may include those older than a specific age and that are not referenced in metadata information stored by the change tracking history component 706.

The transaction data component 706 generates and stores transaction data for each transaction that is executed on a table. The transaction data component 706 may associate the transaction data with a new micro-partition such that the transaction data is stored as metadata in the new micro-partition. Such transaction data may include, for example, an identity of a user or account that initiated a DML or SQL statement, when the transaction was requested, when the transaction was initiated, when the transaction was completed, how the transaction impacted the table, what rows and/or micro-partitions were modified by the transaction, and so forth.

The modification data component 708 stores and manages information about changes made to the table data. The modification data may be stored in local mutable storage and/or within the table data as a change tracking column, for example. In one embodiment, the modification data may be stored and updated in-place. In one embodiment, the modification data is stored within an immutable micro-partition in a change tracking column indicating a most recent change that occurred on a row and/or a log of changes that have occurred on the table. In an embodiment, the modification data component 708 secures a timestamp to a transaction that occurred on the table and further secures a timestamp to each change or modification that occurs on one or more rows of the table.

The joining component 710 joins transaction data with modification data. The joining component 710 may store the joined data as metadata within a new micro-partition. The joined data may be stored in local mutable storage and/or within the table data in a column, for example.

The change tracking component 712 determines and stores a lineage of modifications made to a table. The lineage may be stored in local mutable storage and/or within the table data such as a change tracking column, for example. The lineage may include joined data or modification data. The lineage may be queried to determine either of a delta indicating a net change between a first timestamp and a second timestamp and/or a comprehensive change tracking summary indicating all changes that occurred on the table between the first timestamp and the second timestamp.

The querying component 714 may run a single query to determine what rows and/or micro-partitions in a table have been changed and further determine what transactions caused each change to the table. The querying component may run the query on any of the transaction data, the modification data, and/or the joined data to determine a comprehensive change tracking summary for the table. The querying component 714 may be utilized to greatly reduce the cost for determining the comprehensive change tracking summary for the table by negating the need to determine a change between a plurality of sequential pairs of table versions.

The encryption component 716 is configured to encrypt table data and metadata. In one embodiment, the encryption component 716 encrypts the metadata column-by-column to allow for independent decryption and reading of metadata for a specific column.

The reporting component 718 generates a report based on data determined by the querying component 714. The report may include a comprehensive summary of all transactions that have been executed on a table, and how those transaction modified the time, between two timestamps. The report may further include, for example, an indication of when each of the transactions and/or intermediate modifications to the table occurred, an indication of what transactions caused each intermediate modification on the table, an indication of what rows of the table were modified by what transaction, an indication of what user account initiated a transaction that caused a modification on the table, and so forth.

Figure 8:
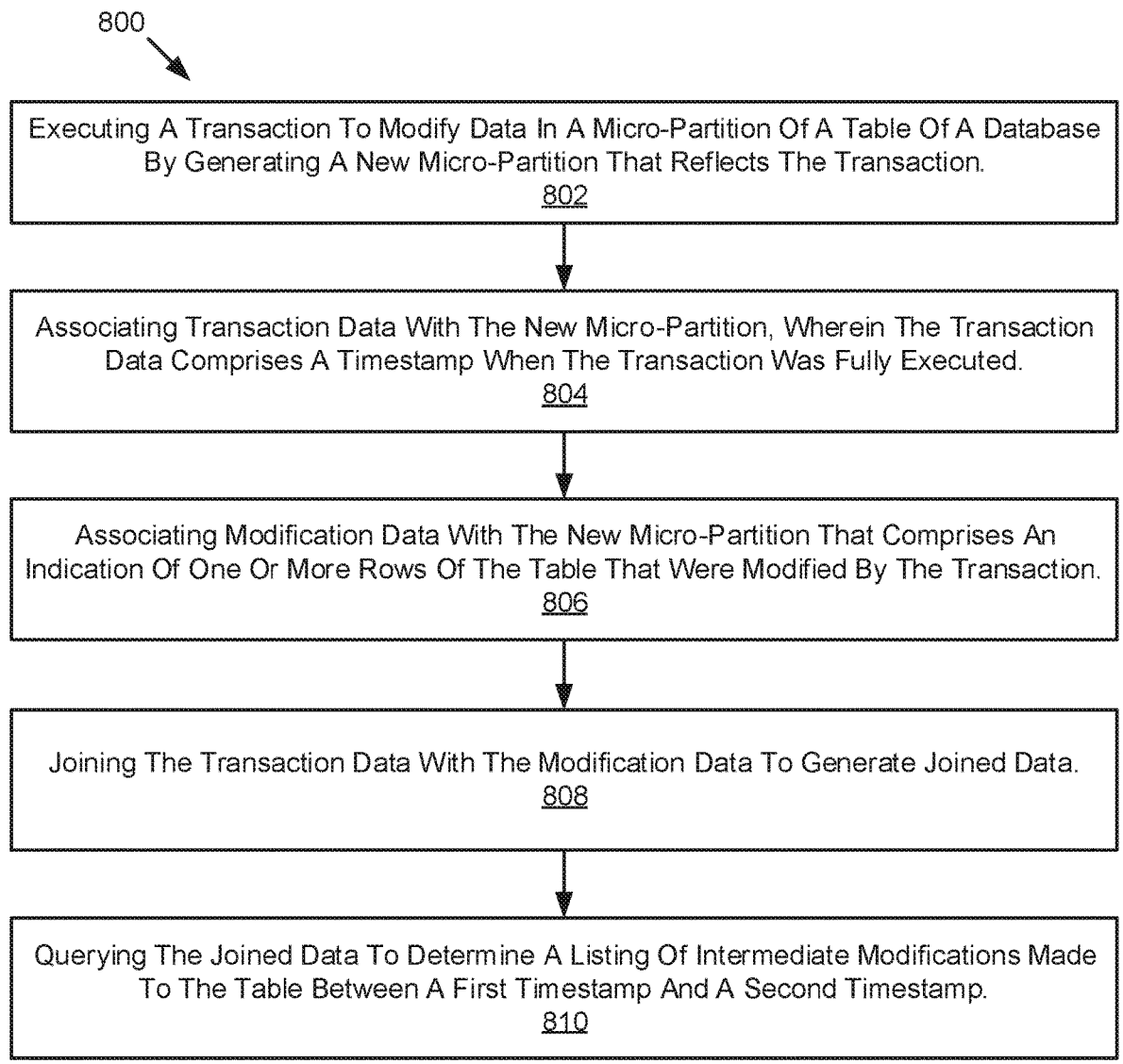
FIG. 8 is a schematic flow chart diagram illustrating a method for tracking changes to database data, according to one embodiment.

FIG. 8 is a schematic flow chart diagram illustrating an example method 800 for determining a series of changes made to a database table. The method 800 may be performed by a change tracking manager 628, database service manager 502, processing platform 500, and/or other service or platform.

The method 800 begins and a computing device executes at 802 a transaction to modify data in a micro-partition of a table of a database by generating a new micro-partition that reflects the transaction. The computing device associates at 804 transaction data with the new micro-partition, wherein the transaction data comprises a timestamp when the transaction was fully executed. The computing device associates at 806 modification data with the new micro-partition that comprises an indication of one or more rows of the table that were modified by the transaction. The computing device joins at 808 the transaction data with the modification data to generate joined data. The computing device queries at 810 the joined data to determine a listing of intermediate modifications made to the table between a first timestamp and a second timestamp.

Figure 9:
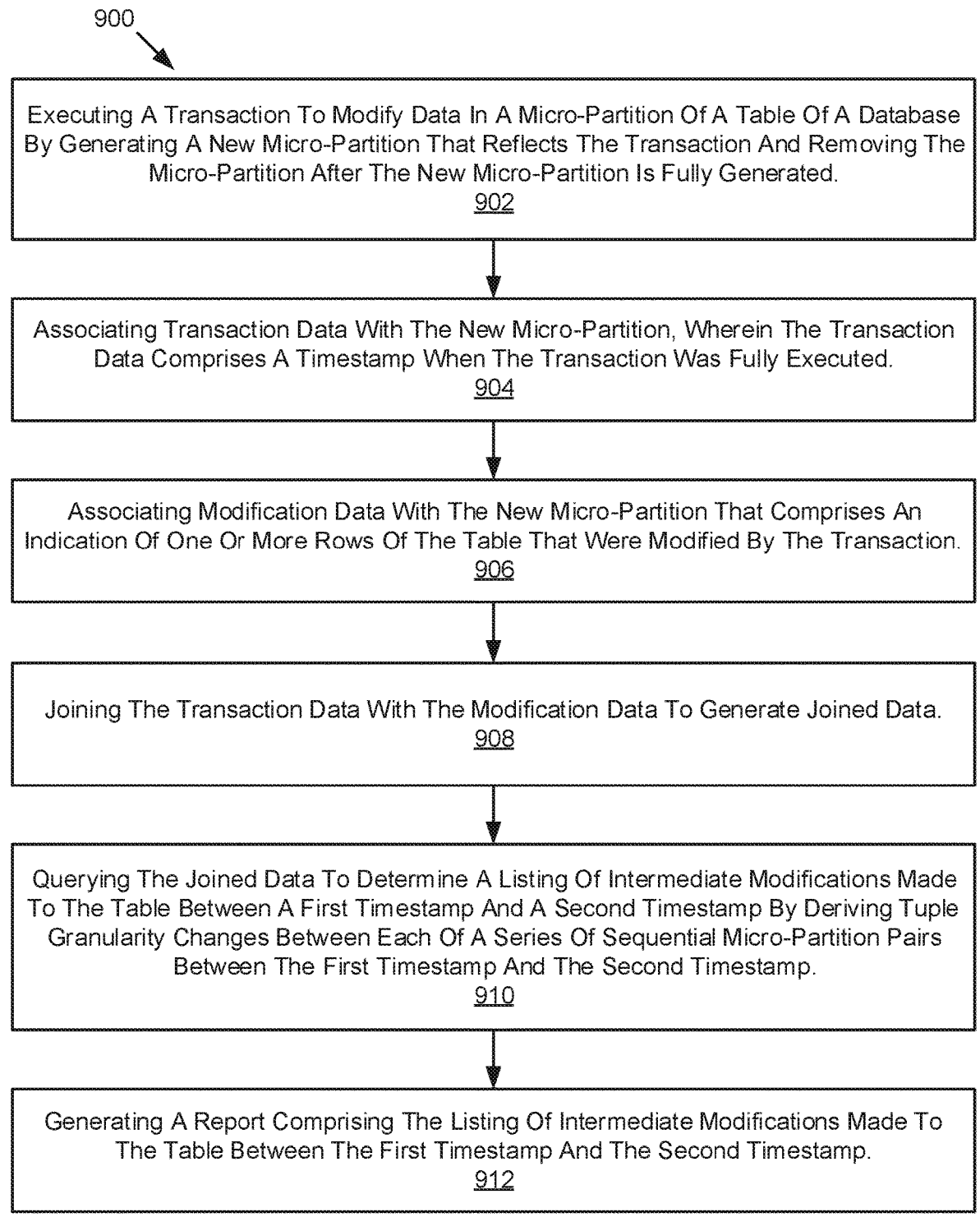
FIG. 9 is a schematic flow chart diagram illustrating a method for tracking changes to database data, according to one embodiment.

FIG. 9 is a schematic flow chart diagram illustrating an example method 900 for determining a series of changes made to a database table. The method 900 may be performed by a change tracking manager 628, database service manager 502, processing platform 500, and/or other service or platform.

The method 900 begins and a computing device executes at 902 a transaction to modify data in a micro-partition of a table of a database by generating a new micro-partition that reflects the transaction and removing the micro-partition after the new micro-partition is fully generated. The computing device associates at 904 transaction data with the new micro-partition, wherein the transaction data comprises a timestamp when the transaction was fully executed. The computing device associates at 906 modification data with the new micro-partition that comprises an indication of one or more rows of the table that were modified by the transaction. The computing device joins at 908 the transaction data with the modification data to generate joined data. The computing device queries at 910 the joined data to determine a listing of intermediate modifications made to the table between a first timestamp and a second timestamp by deriving tuple granularity changes between each of a series of sequential micro-partition pairs between the first timestamp and the second timestamp. The computing device generates at 912 a report comprising the listing of intermediate modifications made to the table between the first timestamp and the second timestamp.

Figure 10:
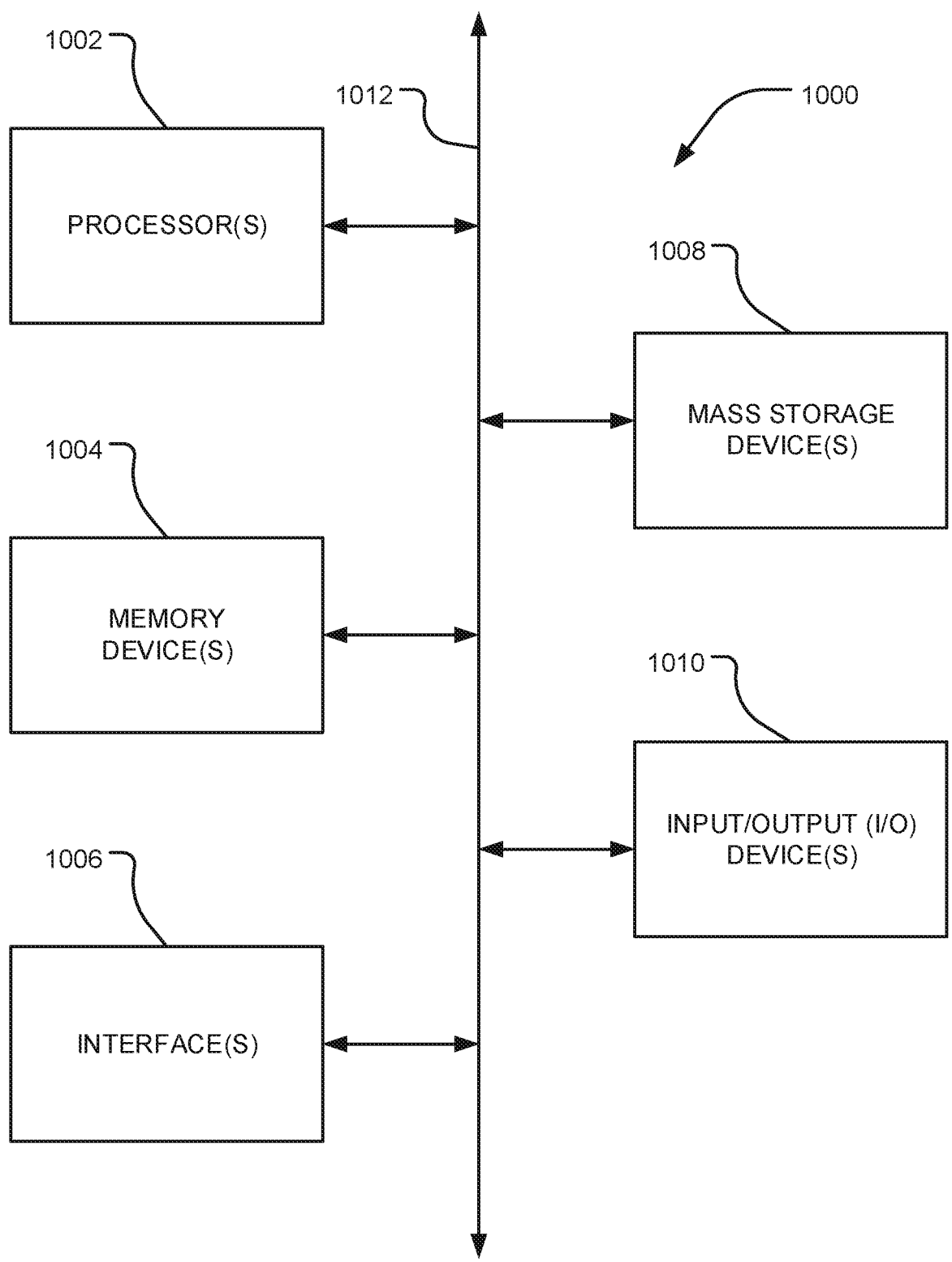
FIG. 10 is a block diagram depicting an example computing device consistent with at least one embodiment of processes and systems disclosed herein.

FIG. 10 is a block diagram depicting an example computing device 1000. In some embodiments, computing device 1000 is used to implement one or more of the systems and components discussed herein. For example, computing device 1000 may include or be part of a change tracking manager 628, a database service manager 502, a processing platform 500, and/or any other components or systems discussed herein. As another example, the components, systems, or platforms discussed herein may include one or more computing devices 1000. Further, computing device 1000 may interact with any of the systems and components described herein. Accordingly, computing device 1000 may be used to perform various procedures and tasks, such as those discussed herein. Computing device 1000 can function as a server, a client or any other computing entity. Computing device 1000 can be any of a wide variety of computing devices, such as a desktop computer, a notebook computer, a server computer, a handheld computer, a tablet, and the like.

Computing device 1000 includes one or more processor(s) 1002, one or more memory device(s) 1004, one or more interface(s) 1006, one or more mass storage device(s) 1008, and one or more Input/Output (I/O) device(s) 1010, all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM)) and/or nonvolatile memory (e.g., read-only memory (ROM)). Memory device(s) 1004 may also include rewritable ROM, such as Flash memory.

Mass storage device(s) 1008 include various computer readable media, such as magnetic tapes, magnetic disks, optical disks, solid state memory (e.g., Flash memory), and so forth. Various drives may also be included in mass storage device(s) 1008 to enable reading from and/or writing to the various computer readable media. Mass storage device(s) 1008 include removable media and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Interface(s) 1006 include various interfaces that allow computing device 1000 to interact with other systems, devices, or computing environments. Example interface(s) 1006 include any number of different network interfaces, such as interfaces to local area networks (LANs), wide area networks (WANs), wireless networks, and the Internet.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, USB bus, and so forth.

EXAMPLES

The following examples pertain to further embodiments.

Example 1 is a method for tracking incremental changes to database data. The method includes executing a transaction to modify data in a micro-partition of a table of a database by generating a new micro-partition that embodies the transaction. The method includes associating transaction data with the new micro-partition, wherein the transaction data comprises a timestamp when the transaction was fully executed and associating modification data with the new micro-partition that comprises an indication of one or more rows of the table that were modified by the transaction. The method includes joining the transaction data with the modification data to generated joined data. The method includes querying the joined data to determine a listing of intermediate modifications made to the table between a first timestamp and a second timestamp.

Example 2 is a method as in Example 1, wherein querying the joined data comprises querying a plurality of entries of joined data for a plurality of transactions executed on the table between the first timestamp and the second timestamp.

Example 3 is a method as in any of Examples 1-2, wherein the transaction comprises one or more of: a delete command, an insert command, an update command, or a merge command.

Example 4 is a method as in any of Examples 1-3, wherein executing the transaction further comprises removing the micro-partition after the new micro-partition is fully generated.

Example 5 is a method as in any of Examples 1-4, wherein associating the transaction data with the new micro-partition comprises inserting the transaction data in a transaction tracking column in the new micro-partition, and wherein associating the modification data with the new micro-partition comprises inserting the modification data in a change tracking column in the new micro-partition.

Example 6 is a method as in any of Examples 1-5, wherein the modification data comprises one or more of: a prior micro-partition identification for a value in the table, a prior row identification for a value in the table, a transaction that occurred on a row of the table, or an indication of whether a value of the table was updated.

Example 7 is a method as in any of Examples 1-6, wherein querying the joined data comprises deriving tuple granularity changes between each of a series of sequential micro-partition pairs between the first timestamp and the second timestamp to determine a series of intermediate modifications made to the table between the first timestamp and the second timestamp, and wherein each of the series of sequential micro-partition pairs is ordered according to timestamps.

Example 8 is a method as in any of Examples 1-7, wherein the associating transaction data with the new micro-partition occurs only after the new micro-partition is fully generated and the transaction is fully executed.

Example 9 is a method as in any of Examples 1-8, wherein the transaction modifies rows of the table that are stored across a plurality of micro-partitions of the table, and wherein executing the transaction comprises generating a plurality of new micro-partitions and removing the plurality of micro-partitions only after the transaction is fully executed.

Example 10 is a method as in any of Examples 1-9, further comprising generating a report comprising one or more of: the listing of intermediate modifications made to the table between the first timestamp and the second timestamp; an indication of when each of the intermediate modifications occurred; an indication of what transaction caused each of the intermediate modifications; an indication of what rows of the table were modified by a transaction that initiated a modification to the table; or an indication of what user account initiated a transaction that initiated a modification to the table.

Example 11 is a system for tracking intermediate changes to database data. The system includes means for executing a transaction to modify data in a micro-partition of a table of a database by generating a new micro-partition that embodies the transaction. The system includes means for associating transaction data with the new micro-partition, wherein the transaction data comprises a timestamp when the transaction was fully executed. The system includes means for associating modification data with the new micro-partition that comprises an indication of one or more rows of the table that were modified by the transaction. The system includes means for joining the transaction data with the modification data to generated joined data. The system includes means for querying the joined data to determine a listing of incremental modifications made to the table between a first timestamp and a second timestamp.

Example 12 is a system as in Example 11, wherein the means for querying the joined data is configured to query a plurality of entries of joined data for a plurality of transactions executed on the table between the first timestamp and the second timestamp.

Example 13 is a system as in any of Examples 11-12, wherein the means for executing the transaction is further configured to remove the micro-partition from the database after the new micro-partition is fully generated.

Example 14 is a system as in any of Examples 11-13, wherein the means for associating the transaction data with the new micro-partition is configured to insert the transaction data in a transaction tracking column in the new micro-partition, and wherein the means for associating the modification data with the new micro-partition is configured to insert the modification data in a change tracking column in the new micro-partition, and wherein the modification data comprises one or more of: a prior micro-partition identification for a value in the table, a prior row identification for a value in the table, a transaction that occurred on a row of the table, or an indication of whether a value of the table was updated.

Example 15 is a system as in any of Examples 11-14, wherein the means for querying the joined data is configured to derive tuple granularity changes between each of a series of sequential micro-partition pairs between the first timestamp and the second timestamp to determine a series of intermediate modifications made to the table between the first timestamp and the second timestamp, and wherein each of the series of sequential micro-partition pairs is ordered according to timestamps.

Example 16 is a system as in any of Examples 11-15, further comprising means for generating a report comprising one or more of: the listing of intermediate modifications made to the table between the first timestamp and the second timestamp; an indication of when each of the intermediate modifications occurred; an indication of what transaction caused each of the intermediate modifications; an indication of what rows of the table were modified by a transaction that initiated a modification to the table; or an indication of what user account initiated a transaction that initiated a modification to the table.

Example 17 is non-transitory computer readable storage media storing instructions that, when executed by one or more processors, cause the one or more processors to: execute a transaction to modify data in a micro-partition of a table of a database by generating a new micro-partition that embodies the transaction; associate transaction data with the new micro-partition, wherein the transaction data comprises a timestamp when the transaction was fully executed; associate modification data with the new micro-partition that comprises an indication of one or more rows of the table that were modified by the transaction; join the transaction data with the modification data to generated joined data; and query the joined data to determine a listing of intermediate modifications made to the table between a first timestamp and a second timestamp.

Example 18 is non-transitory computer readable storage media as in Example 17, wherein the instructions further cause the one or more processors to execute the transaction by removing the micro-partition from the database after the new micro-partition is fully generated.

Example 19 is non-transitory computer readable storage media as in any of Examples 17-18, wherein the instructions cause the one or more processors to associate the transaction data with the new micro-partition by inserting the transaction data in a transaction tracking column in the new micro-partition, and wherein the instructions cause the one or more processors to associate the modification data with the new micro-partition by inserting the modification data in a change tracking column in the new micro-partition, and wherein the modification data comprises one or more of: a prior micro-partition identification for a value in the table, a prior row identification for a value in the table, a transaction that occurred on a row of the table, or an indication of whether a value of the table was updated.

Example 20 is non-transitory computer readable storage media as in any of Examples 17-19, wherein the instructions cause the one or more processors to query the joined data by deriving tuple granularity changes between each of a series of sequential micro-partition pairs between the first timestamp and the second timestamp to determine a series of intermediate modifications made to the table between the first timestamp and the second timestamp, and wherein each of the series of sequential micro-partition pairs is ordered according to timestamps.

Example 21 is non-transitory computer readable storage media as in any of Examples 17-20, wherein the instructions further cause the one or more processors to generate a report comprising one or more of: the listing of intermediate modifications made to the table between the first timestamp and the second timestamp; an indication of when each of the intermediate modifications occurred; an indication of what transaction caused each of the intermediate modifications; an indication of what rows of the table were modified by a transaction that initiated a modification to the table; or an indication of what user account initiated a transaction that initiated a modification to the table.

Example 22 is an apparatus including means to perform a method as in any of Examples 1-10.

Example 23 is a machine-readable storage including machine-readable instructions that, when executed, implement a method or realize an apparatus of any of Examples 1-10.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:
   providing a first micro-partition in a table at a first timestamp, the first micro-partition storing data;
   receiving instructions for a transaction related to the stored data in the first micro-partition;
   in response to the instructions, generating transaction data associated with the instructions and performing multiple modifications to the stored data to generate a second micro-partition and remove the first micro-partition from the table, the second micro-partition being generated at a second timestamp;
   generating a delta table, the delta table storing final changes to the stored data in the second micro-partition at the second timestamp from the first micro-partition at the first timestamp;
   generating modification data, the modification data tracking the modifications performed to the stored data between the first and second timestamps; and
   joining the modification data with the transaction data to generate joined data, the joined data indicating intermediate changes to the stored data between the first and second timestamps.

2. The method of claim 1, further comprising:
   querying the joined data; and
   generating a listing of the intermediate changes.

3. The method of claim 2, wherein querying the joined data includes calculating tuple changes between each of a series of sequential micro-partition pairs between the first and second timestamps.

4. The method of claim 1, further comprising:
   performing multiple modifications to a row of a plurality of rows in the first micro-partition,
   wherein the delta table stores an initial value of the row at the first timestamp and a final value of the row after performance of the multiple modifications to the row at the second timestamp, and
   wherein the joined data indicates at least one intermediate change to the row between the initial and final values.

5. The method of claim 1, wherein the delta table includes information indicating which rows have been modified, final values of rows that have been modified between the first and second timestamps, and an action type of the modification for each row modified.

6. The method of claim 1, further comprising:
   storing the transaction data in the second micro-partition as metadata, wherein the transaction data includes one or more of: an identity of an account that initiated the transaction, the second time stamp, a third timestamp when the transaction was requested, a fourth timestamp when execution of the transaction began, a listing of all rows that were modified by the transaction, and details of the modifications.

7. The method of claim 1, further comprising:
   storing the modification data in the second micro-partition as metadata, wherein the modification data includes a lineage of modifications made to the table.

8. The method of claim 1, further comprising:
   storing the transaction data and the modification data in the second micro-partition as metadata, wherein the metadata is stored in immutable storage.

9. The method of claim 1, further comprising:
   storing the transaction data and the modification data in the second micro-partition as metadata, wherein the metadata is stored in mutable storage.

10. A system comprising:
    one or more processors of a machine; and
    a memory storing instructions that, when executed by the one or more processors, cause the machine to perform operations comprising:
    providing a first micro-partition in a table at a first timestamp, the first micro-partition storing data;
    receiving instructions for a transaction related to the stored data in the first micro-partition;
    in response to the instructions, generating transaction data associated with the instructions and performing multiple modifications to the stored data to generate a second micro-partition and remove the first micro-partition from the table, the second micro-partition being generated at a second timestamp;
    generating a delta table, the delta table storing final changes to the stored data in the second micro-partition at the second timestamp from the first micro-partition at the first timestamp;
    generating modification data, the modification data tracking the modifications performed to the stored data between the first and second timestamps; and
    joining the modification data with the transaction data to generate joined data, the joined data indicating intermediate changes to the stored data between the first and second timestamps.

11. The system of claim 10, the operations further comprising:
    querying the joined data; and
    generating a listing of the intermediate changes.

12. The system of claim 11, wherein querying the joined data includes calculating tuple changes between each of a series of sequential micro-partition pairs between the first and second timestamps.

13. The system of claim 10, the operations further comprising:
    performing multiple modifications to a row of a plurality of rows in the first micro-partition, wherein the delta table stores an initial value of the row at the first timestamp and a final value of the row after performance of the multiple modifications to the row at the second timestamp, and wherein the joined data indicates at least one intermediate change to the row between the initial and final values.

14. The system of claim 10, wherein the delta table includes information indicating which rows have been modified, final values of rows that have been modified between the first and second timestamps, and an action type of the modification for each row modified.

15. The system of claim 10, the operations further comprising:

storing the transaction data in the second micro-partition as metadata, wherein the transaction data includes one or more of: an identity of an account that initiated the transaction, the second time stamp, a third timestamp when the transaction was requested, a fourth timestamp when execution of the transaction began, a listing of all rows that were modified by the transaction, and details of the modifications.

16. The system of claim 10, the operations further comprising:

storing the modification data in the second micro-partition as metadata, wherein the modification data includes a lineage of modifications made to the table.

17. The system of claim 10, the operations further comprising:

storing the transaction data and the modification data in the second micro-partition as metadata, wherein the metadata is stored in immutable storage.

18. The system of claim 10, the operations further comprising:

storing the transaction data and the modification data in the second micro-partition as metadata, wherein the metadata is stored in mutable storage.

19. A non-transitory computer readable storage media storing instructions that, when executed by one or more processors, cause the one or more processors to:

providing a first micro-partition in a table at a first timestamp, the first micro-partition storing data;

receiving instructions for a transaction related to the stored data in the first micro-partition;

in response to the instructions, generating transaction data associated with the instructions and performing multiple modifications to the stored data to generate a second micro-partition and remove the first micro-partition from the table, the second micro-partition being generated at a second timestamp;

generating a delta table, the delta table storing final changes to the stored data in the second micro-partition at the second timestamp from the first micro-partition at the first timestamp;

generating modification data, the modification data tracking the modifications performed to the stored data between the first and second timestamps; and joining the modification data with the transaction data to generate joined data, the joined data indicating intermediate changes to the stored data between the first and second timestamps.

20. The non-transitory computer readable storage media of claim 19, further comprising:

querying the joined data; and generating a listing of the intermediate changes.

21. The non-transitory computer readable storage media of claim 20, wherein querying the joined data includes calculating tuple changes between each of a series of sequential micro-partition pairs between the first and second timestamps.

22. The non-transitory computer readable storage media of claim 19, further comprising:

performing multiple modifications to a row of a plurality of rows in the first micro-partition, wherein the delta table stores an initial value of the row at the first timestamp and a final value of the row after performance of the multiple modifications to the row at the second timestamp, and wherein the joined data indicates at least one intermediate change to the row between the initial and final values.

23. The non-transitory computer readable storage media of claim 19, wherein the delta table includes information indicating which rows have been modified, final values of rows that have been modified between the first and second timestamps, and an action type of the modification for each row modified.

24. The non-transitory computer readable storage media of claim 19, further comprising:

storing the transaction data in the second micro-partition as metadata, wherein the transaction data includes one or more of: an identity of an account that initiated the transaction, the second time stamp, a third timestamp when the transaction was requested, a fourth timestamp when execution of the transaction began, a listing of all rows that were modified by the transaction, and details of the modifications.

25. The non-transitory computer readable storage media of claim 19, further comprising:

storing the modification data in the second micro-partition as metadata, wherein the modification data includes a lineage of modifications made to the table.

26. The non-transitory computer readable storage media of claim 19, further comprising:

storing the transaction data and the modification data in the second micro-partition as metadata, wherein the metadata is stored in immutable storage.

27. The non-transitory computer readable storage media of claim 19, further comprising: storing the transaction data and the modification data in the second micro-partition as metadata, wherein the metadata is stored in mutable storage.

* * * * *